Sept. 19, 1939.　　　　S. M. PHELPS　　　　2,173,593
PRESS
Filed April 1, 1938　　　　2 Sheets-Sheet 1
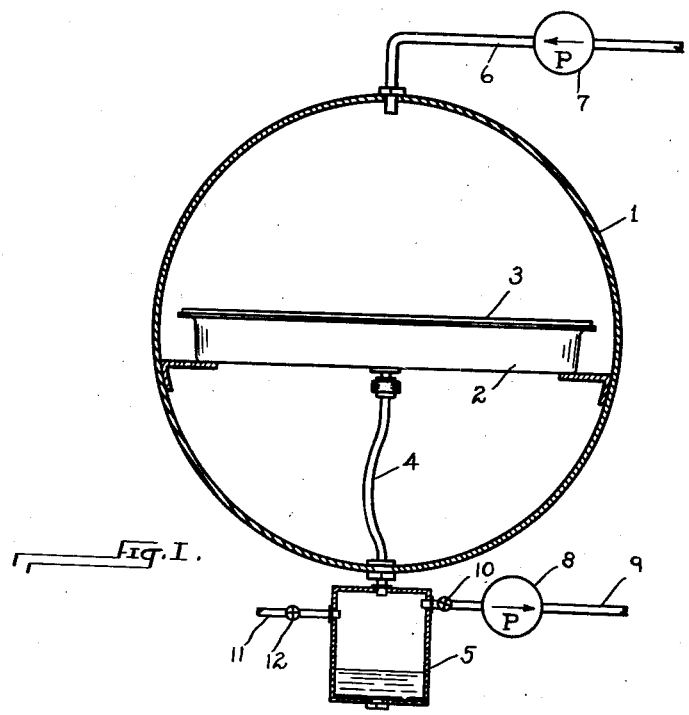
Fig. I.
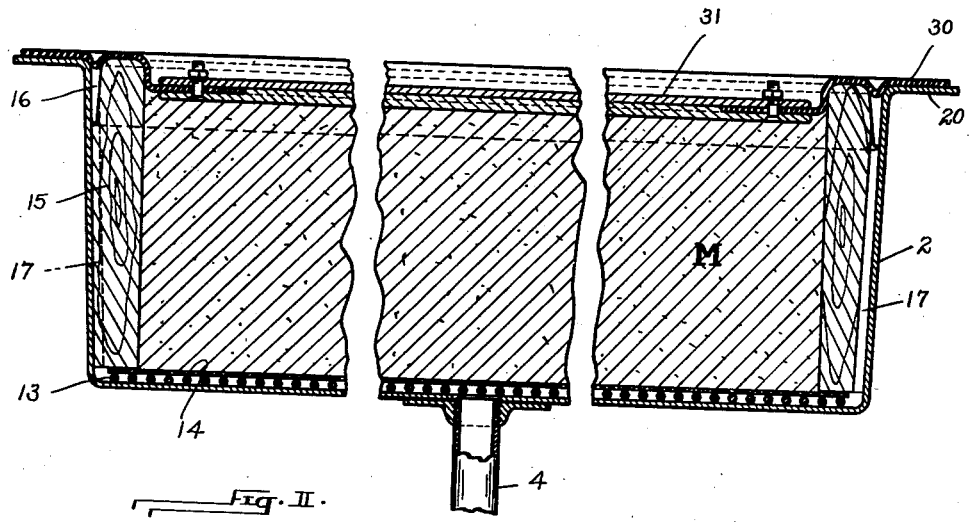
Fig. II.
INVENTOR
Stuart M. Phelps
BY
Christy and Wharton
his ATTORNEYS Sept. 19, 1939.　　　S. M. PHELPS　　　2,173,593
PRESS
Filed April 1, 1938　　2 Sheets-Sheet 2
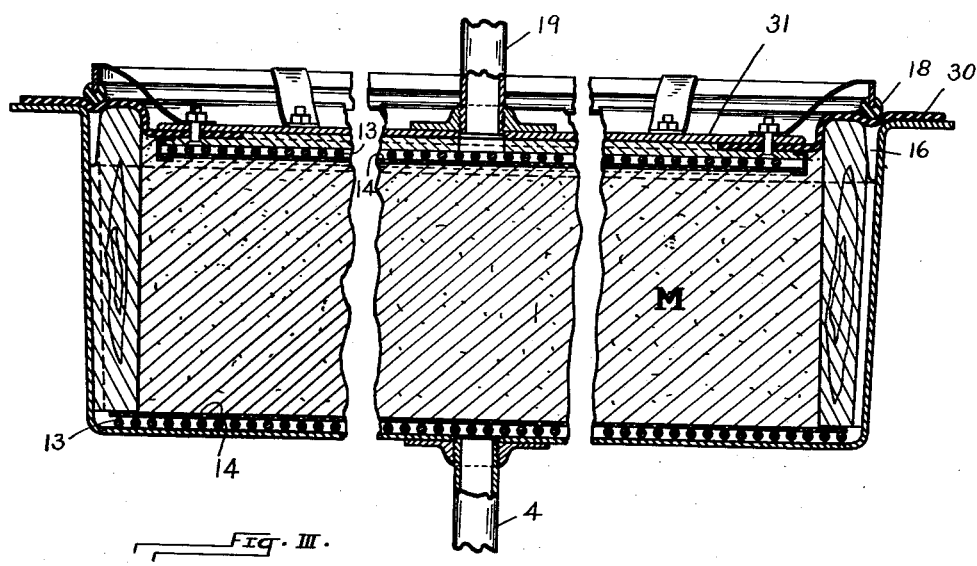
Fig. III.
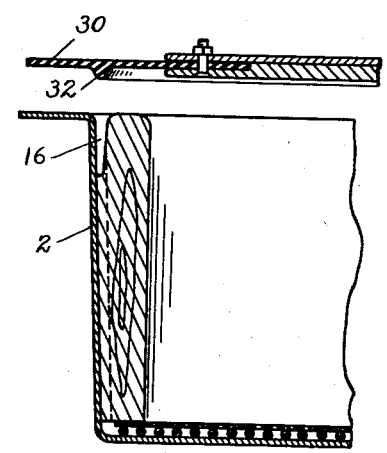
Fig. IV.
INVENTOR
Stuart M. Phelps
BY
Christy and Wharton
his ATTORNEYS

UNITED STATES PATENT OFFICE 2,173,593

PRESS

Stuart M. Phelps, Pittsburgh, Pa., assignor to Ceramic Products Company, a corporation of Delaware Application April 1, 1938, Serial No. 199,507

7 Claims. (Cl. 25—45)

This invention relates to presses and finds practical application in molds in which soft or plastic material is shaped under fluid pressure; and, more specifically, in pressure molding pans for ceramic material. In such application it will here be described. The objects of invention are simplicity in structure and effectiveness for the end in view.

In the accompanying drawings Fig. I is a diagrammatic view, showing in vertical section a pressure chamber and a molding pan in place within; Fig. II is a view to larger scale and in vertical section of the molding pan alone, and in this figure the features that characterize the invention are shown; Fig. III is a view similar to Fig. II, illustrating certain elaborations in detail; Fig. IV is a fragmentary view, on the same plane of section with Figs. II and III, and illustrates a further elaboration.

Into a suitable pressure chamber 1 a molding pan 2 is introduced, and properly supported. The pan includes rigid and integral bottom and walls and a lid 3 that is separately united at its periphery to the rim of the pan, and the union is tight against the passage of fluid under pressure. The lid is, perhaps throughout all its extent, and certainly peripherically, flexible and elastic. The shape and size of the pan are such as to give the desired form and dimensions to an article molded within it—a slab, say, or a special shape for a building material.

The ceramic material that is to be shaped and fired is worked with liquid (ordinarily water) to plastic condition, and in such condition is pressed, to squeeze out the water and to bring the so dewatered mass to coherent condition and to desired shape. After pressing, the coherent cake is removed from the molding pan, dried, and, ordinarily, fired in a kiln. In making use of such a press, a mass of plastic material is charged into and spread within the pan; the lid is applied, and sealed at its periphery. The pan so filled and made ready is brought to position within the pressure chamber and a connection 4 is completed, through which liquid expressed from the mass within the pan may find escape. This connection conveniently extends downward from the pan and through the wall of the pressure chamber. A container for receiving the expressed liquid is diagrammatically indicated at 5. When the pan has been charged and closed and brought to position within the pressure chamber, the chamber is closed and fluid pressure (ordinarily, pneumatic pressure generated by a pump 7) is introduced through a pipe 6 and built up within chamber 1, externally of the closed pan 2. Interiorly, within the pan, through connection 4, atmospheric pressure may be maintained; exteriorly of the pan and within chamber 1 super-atmospheric pressure is built up and maintained. Under such pressure conditions the pan with its flexible and elastic closure collapses, the liquid is squeezed out, and the mass within is molded and consolidated. When such compresion, de-watering, and molding have been carried to proper degree and maintained for proper length of time, the excess pressure is relieved, the chamber is opened, and the pan is removed. The lid is taken off, and at once, or after suitable delay, the molded article is taken from the pan, and may thereafter be subjected to such operations as drying and firing.

It will be understood that the showing of Fig. I is diagrammatic, in that a single pan is shown within the pressure chamber. In an industrial installation it will ordinarily be desirable to adapt the pressure chamber for the reception of many pans, to be subjected simultaneously to the pressing operation.

The invention consists in such improvement in and elaboration of pan structure as to render the pan more readily serviceable and more efficient. In place of mechanical clamping means, such as hitherto have been employed for sealing the lid to the rim of the pan, I provide pneumatic means that, when brought into play, are automatically effective.

Referring particularly to Fig. II of the drawings, it will be remarked of the pan 2 that its rim is extended outwardly and horizontally in a wide flange 20. The lid itself is here shown in preferred form, including a rigid plate 31 with a margin 30 of flexible and elastic material that, when the lid is applied, lies flat, in face-to-face contact, upon the flange 20 of the rim of the pan. Ordinarily the plate 31 will be of metal and the margin 30 will be of rubber pressed in permanent and hermetically tight union with the plate. Means are provided, such, for example, as a pump 8, diagrammatically indicated in Fig. I, for exhausting air, conveniently through the connection 4, from the pan 2. It may be found convenient so far to modify the receptacle 5 for the expressed water as to make it a closed chamber and to cause the pump 8 to exhaust air through chamber 5, connection 4, and pan 2. The exhaust 9 from the pump 8 is conveniently to the open air. A hand-operated valve indicated at 10 may control communication between the chamber 5 and the pump 8. A vent pipe 11 is provided from chamber 5 to the open air, and this vent pipe is subject to the control of a hand-operated valve, indicated at 12.

In operation the pan 2 is charged as usual with a mass M of wet clay, and the lid is applied. The margin 30 of the rim lies flat upon flange 20 of the pan, over an extensive area of contact. The charged and closed pan is brought within pressure chamber 1 and the chamber is closed. Pump 8 is first set in operation, evacuating air from pan 2 and thereby effecting fluid-tight seal of the margin of the lid to the rim of the pan. Pump 7 is set in operation; and then, without any leakage at the rim of the pan, pressure is built up within chamber 1, and the pressing and molding operation goes forward. The pump 8 may continue in operation, increasing the difference in pressure within and without the pan; or, when once a sealing pressure has been built up within the chamber 1 and externally of the pan, valve 10 may be closed and valve 12 opened, and thereafter the pan interiorly will be subject to atmospheric pressure and the pressure from without chamber 1 will be effective, to the extent that it exceeds atmospheric pressure.

Further features of structure new with me relate themselves to and are auxiliary to the pneumatic sealing of the closed pan, already described. It is usual to place in the bottom of the pan a perforate plate, commonly a sheet of wire netting 13, and to lay upon this perforate plate a water-permeable web, ordinarily a web 14 of canvas, and to charge the mass M of wet clay immediately upon the web of canvas. By such provision the expressed water finds readier escape; and by such provision, manifestly, the suction that in the practice of my invention is exerted by pump 8 finds readier effect.

It is a matter of some difficulty to remove the de-watered and molded article from the pan without disfiguring break or crumbling of the edges; and, with that difficulty in mind, I preferably form the pan with slightly flaring walls and place within the pan an annular block 15, preferably of impregnated wood, forming a lining to the walls. The pan is opened (sealing pressure being relieved) merely by stripping the lid away, and then, by inverting the pan, the molded article within and the annular block 15 fall away as a unit. Thereafter the annular block 15 may readily be stripped from the molded article without mutilation thereof.

This annular block 15 may be minutely shaped to make more effective the pan-sealing means described. To such end the block is so shaped that in the assembly its upper edge extends in substantially common plane with the upper face of flange 20; and, additionally, the block at its upper outer periphery is provided with a groove which, when the parts are assembled, forms immediately within the rim of the pan, and immediately beneath the flexible margin 30 of the lid, a continuous circumferential space 16. The block 15 is provided with one or more ducts, that conveniently take the form of superficial grooves 17 extending longitudinally in its outer face, and that establish free pneumatic communication between the open space afforded in the bottom of the pan by the perforate plate 13 and the circumferential space 16 at the rim of the assembled pan. Any suction exerted through connection 4 will be immediately and without appreciable diminution effective in the space 16 to deflect the margin of the lid into the space 16 and so more effectually to seal the lid to the rim.

The annular block is, it will be perceived, essentially a liner for the side walls of the pan. Instead of being unitary, the block may be formed of a plurality of arc-shaped sections, to facilitate separation from the molded article.

In Fig. III the lid of the pan is shown to be equipped with a spring-backed bead 18, so shaped and proportioned that in the assembly it depresses the flexible margin 30 of the lid into the mouth of the space 16. This bead manifestly brings the surfaces of the rim of the pan and of the margin of the lid into contact, so that difference in fluid pressure is immediately effective to seal the pan. In Fig. IV the flexible margin 30 of the lid is shown to be provided on its nether surface with a circumferential welt or ridge 32 that in the assembly enters the mouth of the space 16 and similarly serves to render the pan-sealing difference in pressure immediately effective.

In Fig. III the perforate plate 13 and its facing 14 of canvas are duplicated, above and below, and by the two facings the mass M is immediately engaged. The upper plate with its facing is advantageously mounted upon the rigid central portion 31 of the lid and forms with the lid a unit in application and removal. Suction is made effective in the space afforded by the upper perforate plate by means of a pipe 19 that opens through the lid and that obviously may lead either to pump 8 or to other suction-creating apparatus.

The invention has been developed in application to a pressure mold for ceramics. Manifestly it is of general applicability where liquid is to be pressed from soft or plastic material.

I claim as my invention:

1. In a press for liquid-containing material the combination of a chamber, means for building up pressure within the chamber, a container removably mounted within the chamber and a liquid escape connection leading from the container through the chamber wall, the container being provided with a removable lid, and the container and its lid being provided with a flexible and resilient flange and with an opposed rigid flange-engaging surface, whereby pressure from without in excess of pressure within effects an hermetically tight seal between container and lid and effects also a liquid-expelling collapse of the filled and closed container.

2. The structure of claim 1, the container being provided with a peripheral plane-faced rigid surface and the lid including a flexible and resilient flange adapted when the lid is applied to make extended face-to-face contact with said surface.

3. In a pressure mold for ceramics the combination of a rigid pan and a lid with flexible margin, a perforate plate faced with water-permeable fabric resting in the bottom of the pan, a liner for the walls of the pan forming with the walls and at the rim of the pan a circumferential space, the flexible margin of the lid overlying, when assembly is made, such space and closing it above, and means for establishing a condition of excess pressure exteriorly of the pan, whereby the flexible margin of the lid overlying such space may be pressed into sealing contact with the rim of the pan.

4. The structure of claim 3 together with means for yieldingly pressing the substance of the flexible margin of the lid, when the lid is applied, into such circumferential space.

5. The structure of claim 3, the flexible margin of the lid being provided with a circumferential ridge adapted, when the lid is applied, to enter such circumferential space.

6. In a pressure mold for ceramics the combination of a rigid pan and a lid with flexible margin, a perforate plate faced with water-permeable fabric resting in the bottom of the pan, an annulus of rigid material provided longitudinally with an air duct arranged within the pan and forming with the wall of the pan a circumferential space at the rim, the flexible margin of the lid overlying, when assembly is made, such space and closing it above, the said pan having a bottom orifice, and means for exhausting air from the closed pan through such orifice.

7. In a pressure mold for ceramics the combination of a rigid pan with plane-surfaced rim and a lid with flexible margin applicable to and removable from the pan and when in place making surface-to-surface engagement with the rim of the pan, whereby fluid pressure exteriorly of the closed pan in excess of pressure within will effect sealing engagement of the flexible margin of the lid with the rim of the pan, perforate plates faced with water-permeable fabric facing the bottom and the lid of the pan and adapted immediately to engage a charge of material within the pan, and means for establishing a condition of pressure exteriorly in excess of the pressure within the closed pan.

STUART M. PHELPS.